US012649587B2

(12) United States Patent (10) Patent No.: US 12,649,587 B2
Tasse Roy (45) Date of Patent: Jun. 9, 2026

(54) SHUTDOWN/RESTART OR KEEP RUNNING DETERMINATIONS FOR AIRCRAFT MANAGEMENT

(71) Applicant: Pratt & Whitney Canada Corp., Longueuil (CA)

(72) Inventor: Alexandre Tasse Roy, Varenne (CA)

(73) Assignee: Pratt & Whitney Canada Corp., Longueuil (CA)

( * ) Notice: Subject to any disclaimer, the term of this patent is extended or adjusted under 35 U.S.C. 154(b) by 98 days.

(21) Appl. No.: 18/435,270

(22) Filed: Feb. 7, 2024

(65) Prior Publication Data

US 2025/0250027 A1 Aug. 7, 2025

(51) Int. Cl.
B64D 45/00 (2006.01)
B64D 31/06 (2024.01)

(52) U.S. Cl.
CPC ............. B64D 45/00 (2013.01); B64D 31/06 (2013.01)

(58) Field of Classification Search
CPC ............................... B64D 45/00; B64D 31/06
See application file for complete search history.

(56) References Cited

U.S. PATENT DOCUMENTS 8,918,264 B2 12/2014 Jegu et al.
10,176,648 B2 1/2019 Descubes et al.

2013/0020430 A1* 1/2013 Cox ...................... B64C 25/405
244/50
2018/0067480 A1* 3/2018 Ellis ....................... G06Q 10/04
2020/0327587 A1 10/2020 Cabos et al.

FOREIGN PATENT DOCUMENTS

WO 2022214764 A1 10/2022

OTHER PUBLICATIONS

European Search Report dated Apr. 14, 2025, in connection with European Application No. 25154773.3, 24 pages.
Honle, et al., "Engine Quick Start in Case of Emergency—A Requirement for Saving Fuel by Means of Engine Shutdown," European Rotorcraft Forum, Sep. 2012, 8 pages.
Communication pursuant to Article 94(3) EPC dated Feb. 18, 2026, in connection with European Application No. 25154773.3, 9 pages.

* cited by examiner

*Primary Examiner* — Todd Melton
*Assistant Examiner* — Oliver Tan

(57) ABSTRACT
A method includes obtaining, using at least one processing device, real-time information associated with operation of an aircraft from one or more sensors of the aircraft. The method also includes obtaining, using the at least one processing device, additional information associated with the aircraft, where at least some of the additional information is associated with limited lifetime parts of the aircraft. The method further includes processing, using the at least one processing device, the real-time information and the additional information to generate a determination whether one or more engines of the aircraft should continue running or should be shut down and subsequently restarted. In addition, the method includes generating, using the at least one processing device, at least one output identifying how to operate the one or more engines of the aircraft based on the determination.

20 Claims, 4 Drawing Sheets

SHUTDOWN/RESTART OR KEEP RUNNING DETERMINATIONS FOR AIRCRAFT MANAGEMENT

TECHNICAL FIELD

This disclosure is generally directed to aircraft management. More specifically, this disclosure is directed to shutdown/restart or keep running determinations for aircraft management.

BACKGROUND

Aircraft are routinely used to make numerous trips between two or more locations. For example, helicopters, air taxis, or other aircraft may be used to repeatedly transport people to and from specified locations. In some cases, the aircraft may be used to drop some passengers off at a specified location and pick up other passengers at the same location a short time later.

SUMMARY

This disclosure is directed to shutdown/restart or keep running determinations for aircraft management.

In a first embodiment, a method includes obtaining, using at least one processing device, real-time information associated with operation of an aircraft from one or more sensors of the aircraft. The method also includes obtaining, using the at least one processing device, additional information associated with the aircraft, where at least some of the additional information is associated with limited lifetime parts of the aircraft. The method further includes processing, using the at least one processing device, the real-time information and the additional information to generate a determination whether one or more engines of the aircraft should continue running or should be shut down and subsequently restarted. In addition, the method includes generating, using the at least one processing device, at least one output identifying how to operate the one or more engines of the aircraft based on the determination.

In a second embodiment, an apparatus includes at least one processing device configured to obtain real-time information associated with operation of an aircraft from one or more sensors of the aircraft. The at least one processing device is also configured to obtain additional information associated with the aircraft, where at least some of the additional information is associated with limited lifetime parts of the aircraft. The at least one processing device is further configured to process the real-time information and the additional information to generate a determination whether one or more engines of the aircraft should continue running or should be shut down and subsequently restarted. In addition, the at least one processing device is configured to generate at least one output identifying how to operate the one or more engines of the aircraft based on the determination.

In a third embodiment, a non-transitory machine readable medium contains instructions that when executed cause at least one processor to obtain real-time information associated with operation of an aircraft from one or more sensors of the aircraft. The non-transitory machine readable medium also contains instructions that when executed cause the at least one processor to obtain additional information associated with the aircraft, where at least some of the additional information is associated with limited lifetime parts of the aircraft. The non-transitory machine readable medium further contains instructions that when executed cause the at least one processor to process the real-time information and the additional information to generate a determination whether one or more engines of the aircraft should continue running or should be shut down and subsequently restarted. In addition, the non-transitory machine readable medium contains instructions that when executed cause the at least one processor to generate at least one output identifying how to operate the one or more engines of the aircraft based on the determination.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
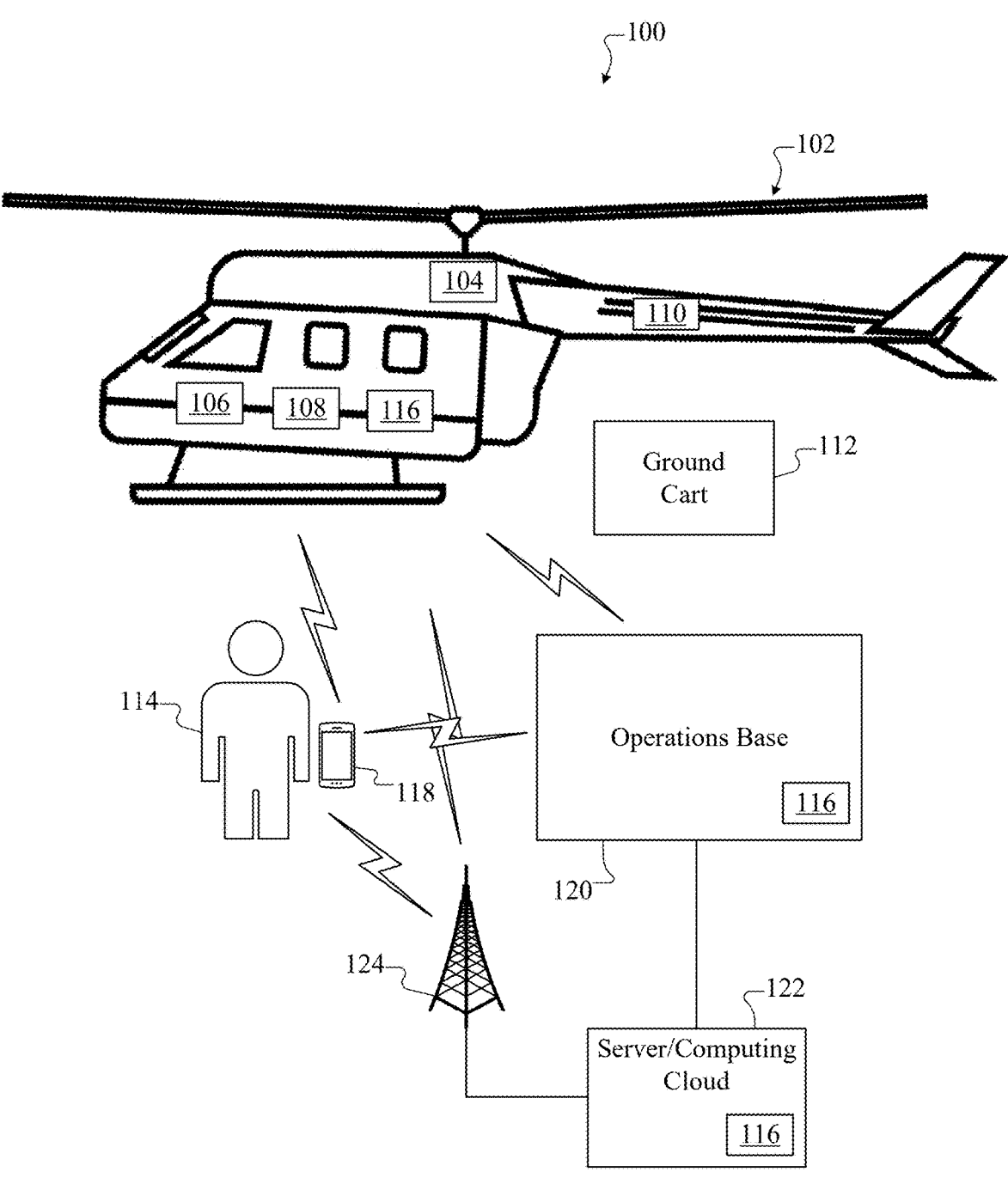
FIG. 1 illustrates an example system supporting shutdown/restart or keep running determinations for aircraft management according to this disclosure.

FIGS. 1 through 5, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, aircraft are routinely used to make numerous trips between two or more locations. For example, helicopters, air taxis, or other aircraft may be used to repeatedly transport people to and from specified locations. In some cases, the aircraft may be used to drop some passengers off at a specified location and pick up other passengers at the same location a short time later. One issue that can arise during operation of aircraft is how to operate the aircraft during waiting periods when the aircraft is on the ground, such as during periods in which current passengers are leaving the aircraft and additional passengers are entering the aircraft. There is no convenient way for owners or operators of the aircraft to determine during this time whether one or more engines of the aircraft should be kept running or should be shut down and later restarted.

This disclosure provides various techniques for making shutdown/restart or keep running determinations for aircraft management. As described in more detail below, various information associated with an aircraft can be obtained. Example types of information that can be obtained may include an actual current consumption of fuel or other consumables by the aircraft, a current price of fuel or other consumables for the aircraft, and a mission profile for the aircraft. Another example type of information that can be obtained may include, for each of one or more limited lifetime parts of the aircraft, an estimated cost of the limited lifetime part per cycle of the aircraft. Yet another example type of information that can be obtained may include an estimated price of using a ground cart to temporarily power the aircraft. The obtained information is processed in order to make a determination whether one or more engines of the aircraft should be kept running or shut down and later restarted. One or more outputs based on the determination can be provided to at least one user, such as a pilot of the aircraft. The one or more outputs may take various forms, such as an indication that the aircraft engine(s) should be kept running or shut down or a countdown timer indicating an amount of time the aircraft engine(s) may be kept running (meaning a shutdown should occur if the aircraft is not ready for its next trip at the end of the identified amount of time). The one or more outputs represent guidance on how to manage operation of the aircraft.

Depending on the implementation, the described techniques can allow for more effective and economical usage of the aircraft. For example, a determination of whether to keep the aircraft's engine(s) running or to shut down the aircraft's engine(s) can be made quickly, and the determination can be made based on current real-time information (such as current fuel consumption, oil consumption, or other consumables consumption by the aircraft). This can be useful since some characteristics like consumables consumption can vary based on a number of factors, such as ambient temperature and elevation. Moreover, the described techniques may be used to help reduce overall emissions and provide benefits like increased or maximized use of parts and reduced waste. For instance, other approaches might simply assume that always shutting down an aircraft's engine(s) is desirable since it reduces emissions immediately by not keeping the engine(s) operating. However, this fails to consider the emissions needed to obtain raw materials and fabricate and transport aircraft parts (including limited lifetime parts), and this fails to consider waste generated by replacing limited lifetime parts of the aircraft more frequently. The described techniques can be used to help balance the desire to stop using fuel while an aircraft is on the ground with the desire to reduce or minimize part replacements on the aircraft.

FIG. 1 illustrates an example system 100 supporting shutdown/restart or keep running determinations for aircraft management according to this disclosure. As shown in FIG. 1, the system 100 includes or is used in conjunction with an aircraft 102. The aircraft 102 represents any suitable flight vehicle, such as a flight vehicle that can carry one or more passengers or cargo between locations. In this particular example, the aircraft 102 is shown as representing a helicopter. However, other types of aircraft 102 may be used here, such as a large commercial jet, a regional jet, or a business/private jet.

The aircraft 102 itself may include a large number of components and subsystems. Among other things, the aircraft 102 includes one or more engines 104, which can be used to create forward, upward, or other movements of the aircraft 102 (depending on the specific type of aircraft 102). The aircraft 102 also includes various limited lifetime parts 106 and various sensors 108. Each limited lifetime part 106 refers to a part of the aircraft 102 that can only be used for a limited number of cycles, where each cycle refers to a period of time between the aircraft's engine(s) 104 turning on and the aircraft's engine(s) 104 being shut down. As a particular example, each engine 104 of the aircraft 102 may include a turbine disc, and the turbine disc may have a limited lifetime of 10,000 to 20,000 cycles. After the specified number of cycles is reached, the turbine disc would typically need to be replaced for safety reasons. Note that this is one example of a limited lifetime part 106 and that the aircraft 102 may include any suitable number(s) and type(s) of limited lifetime parts 106.

The sensors 108 are generally used to sense or measure various characteristics associated with the aircraft 102 or its environment. The sensors 108 can be used to sense or measure any suitable characteristics, such as temperature, altitude, attitude, heading, rate of climb, or location. One or more of the sensors 108 can also be used to measure one or more real-time characteristics of the aircraft 102 for use in determining whether to keep the engine(s) 104 of the aircraft 102 running on the ground and whether to shut down the engine(s) 104 of the aircraft 102. For instance, the sensors 108 may include at least one real-time consumables consumption sensor, which can measure the amount of fuel, oil, or other consumable(s) being consumed by the aircraft 102 in real-time. The amount of consumables being consumed by the aircraft 102 may be expressed in any suitable manner, such as pounds or kilograms per minute. Note, however, that other embodiments of a consumption sensor might be used, such as one that estimates consumption based on one or more specified factors.

Some types of aircraft 102 may optionally include at least one auxiliary power unit (APU) 110, which is generally used to provide electrical power to the aircraft 102 for purposes other than propulsion. For example, the APU 110 may be used to power lighting equipment, communications equipment, heating/ventilation/air conditioning (HVAC) equipment, or other equipment on the aircraft 102 when the aircraft's engine or engines 104 are shut down. Also or alternatively, the aircraft 102 may have the ability to be coupled to a ground cart 112 when the aircraft 102 is parked on the ground. Like the APU 110, the ground cart 112 can generally be used to provide electrical power to the aircraft 102 for purposes other than propulsion, such as to power one or more of the various types of equipment mentioned above. The APU 110 can form a part of the aircraft 102 itself, while the ground cart 112 can be electrically coupled to the aircraft 102 but it not typically carried on the aircraft 102 itself.

As noted above, the aircraft 102 may be repeatedly used to transport passengers or cargo or otherwise travel between two or more locations. As a result, there are often times when the aircraft 102 is on the ground or other location and a pilot 114 or other personnel associated with the aircraft 102 need to decide whether to (i) keep the engine(s) 104 of the aircraft 102 running or (ii) shut down the engine(s) 104 of the aircraft 102 and later restart the engine(s) 104 of the aircraft 102. As described in more detail below, at least one application 116 may be used in the system 100 to determine whether the engine(s) 104 of the aircraft 102 should continue running or be shut down and later restarted.

The application 116 may be implemented in various ways, examples of which are shown in FIG. 1. As an example, the application 116 may be implemented on the aircraft 102 itself, such as when the application 116 is implemented using software/firmware instructions executed by at least one processing device of the aircraft 102. As a particular example, the application 116 may form part of or be included in an electronic engine controls (EEC) system or a flight management system (FMS) of the aircraft 102. As another example, the application 116 may be implemented on a mobile electronic device 118 used by the pilot 114 or other personnel associated with the aircraft 102, such as when the application 116 is implemented using software/ firmware instructions executed by at least one processing device of the mobile electronic device 118. The mobile electronic device 118 may take various forms, such as a smartphone, tablet computer, laptop computer, or specialized device. As still another example, the application 116 may be executed using at least one computing device at an operations base 120, which may represent a facility associated with an airport or other landing site for the aircraft 102 or a facility associated with an owner or operator of the aircraft 102. The operations base 120 may be relatively close to or far from the aircraft 102 depending on the circumstances. In some cases, the operations base 120 may communicate with the aircraft 102, mobile electronic device 118, or other components of the system 100. As yet another example, the application 116 may be executed using a server or computing cloud 122, which again may be relatively close to or far from the aircraft 102 depending on the circumstances. The server or computing cloud 122 may communicate with the aircraft 102, mobile electronic device 118, operations base 120, or other components of the system 100. In some embodiments, at least one wide area network, local area network, or other network (which in FIG. 1 is represented using at least one base station 124 or other networking equipment) may be used to facilitate wireless communications between components of the system 100. Note, however, that the application 116 may be implemented in any suitable manner and is not limited to these specific examples.

The application 116 can use a variety of data, including data from the aircraft 102 itself in order to determine whether to keep the engine(s) 104 of the aircraft 102 running or to shut down the engine(s) 104 of the aircraft 102. Any suitable information can be obtained and processed by the application 116, and the information may be obtained from any suitable source or sources. For example, a real-time or other consumption of fuel or other consumables being used by the aircraft 102 may be obtained, such as from at least one sensor 108 of the aircraft 102. A current price of fuel or other consumables for the aircraft 102 may be obtained from the operations base 120 or from the server or computing cloud 122. In some cases, the price of fuel or other consumables can vary based on a number of factors, such as location of the aircraft 102. A mission profile for the aircraft 102 may be obtained from the pilot 114 or other personnel associated with the aircraft 102, such as via a display of the aircraft 102 or the mobile electronic device 118, or from the operations base 120. In some cases, the mission profile can represent a profile of actions to occur using the aircraft 102 and may (among other things) include an indication of how the aircraft 102 is going to be used in the near future, such as by identifying a forecasted time to next start when the pilot 114 is expecting the aircraft 102 to begin using its engine(s) 104 for its next flight. Information associated with one or more limited lifetime parts 106 of the aircraft 102, such as an estimated cost of each limited lifetime part per cycle of the aircraft 102, may be obtained from a memory of the aircraft 102, from the operations base 120, or from the server or computing cloud 122. An estimated price of using the ground cart 112 to temporarily power the aircraft 102 may be obtained from a nearby operations base 120. Note, however, that the application 116 may obtain any suitable information in any suitable manner and is not limited to these specific examples.

As described in more detail below, the application 116 can implement suitable logic that processes the obtained information in order to make a determination whether the engine(s) 104 of the aircraft 102 should be kept running or turned off and later restarted. The results of the determination can be presented or used in any suitable manner. For example, in some embodiments, the application 116 may generate an output that requests or instructs the pilot 114 or other personnel to turn off the aircraft's engine(s) 104 or to keep the aircraft's engine(s) 104 running. The application 116 may also or alternately generate a countdown timer indicating an amount of time the aircraft's engine(s) 104 may be kept running, which allows the pilot 114 or other personnel to determine whether it is likely that the aircraft 102 will be ready for its next flight prior to expiration of the timer. One or both of these outputs or other suitable output(s) may be presented on a display in the aircraft 102, presented on a display of the mobile electronic device 118, or presented in any other suitable manner. In other embodiments, the results of the determination may be used to automatically control operation of the engine(s) 104 of the aircraft 102. Note, however, that the results of the determination may be used in any suitable manner and are not limited to these specific examples.

Although FIG. 1 illustrates one example of a system 100 supporting shutdown/restart or keep running determinations for aircraft management, various changes may be made to FIG. 1. For example, components can be added, omitted, combined, further subdivided, replicated, or placed in any other suitable configuration in FIG. 1 according to particular needs. As a particular example, one or more applications 116 may be used to make shutdown/restart or keep running determinations for multiple aircraft 102 and possibly different types of aircraft 102. Also, while specific wired and wireless connections are shown in FIG. 1, these connections can easily vary based on the specific implementation of the system 100.

Figure 2:
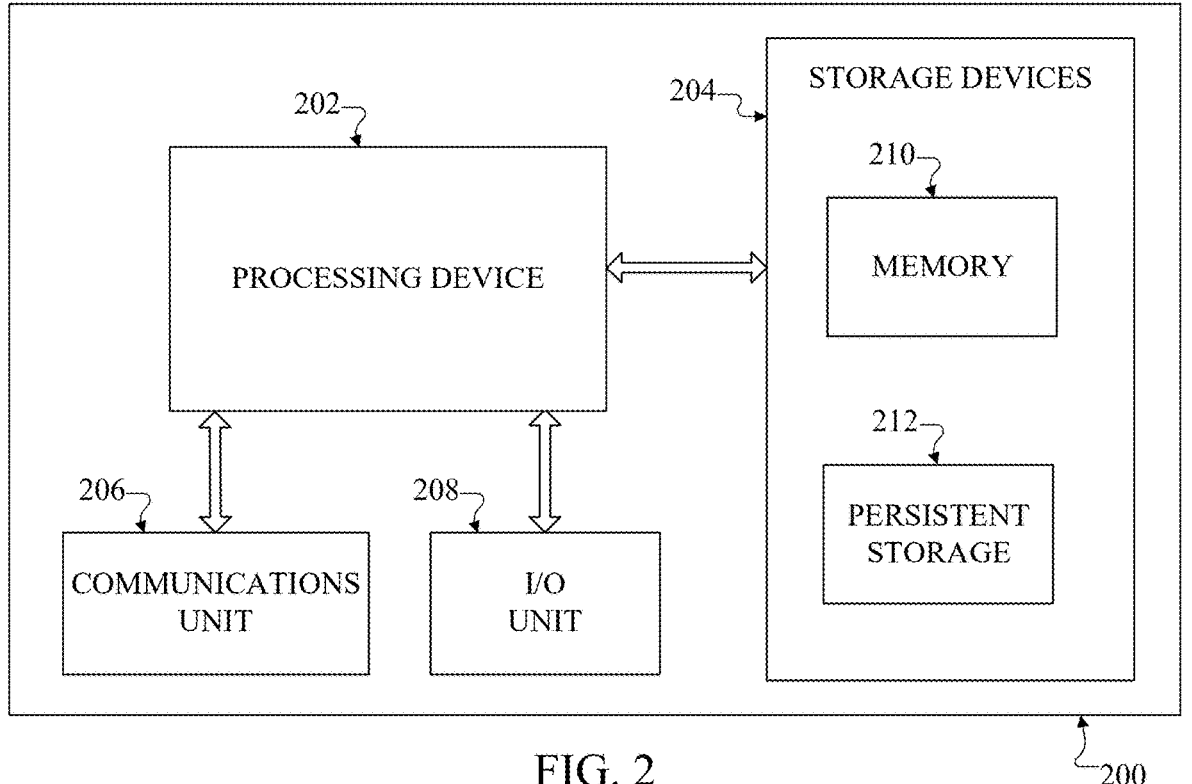
FIG. 2 illustrates an example device supporting shutdown/restart or keep running determinations for aircraft management according to this disclosure.

FIG. 2 illustrates an example device 200 supporting shutdown/restart or keep running determinations for aircraft management according to this disclosure. One or more instances of the device 200 may, for example, be used to execute or otherwise support the functionality of the application 116 in FIG. 1. Depending on the implementation, the device 200 may represent part of the aircraft 102, part of the mobile electronic device 118, part of the operations base 120, or part of the server or computing cloud 122. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the application 116. Thus, for example, the instructions executed by the processing device 202 may obtain information related to the aircraft 102 (including information related to the operation of the aircraft 102), determine whether the engine(s) 104 of the aircraft 102 should remain running or be shut down, and generate one or more outputs or take one or more other actions based on the determination.

Although FIG. 2 illustrates one example of a device 200 supporting shutdown/restart or keep running determinations for aircraft management, various changes may be made to FIG. 2. For example, computing and communication devices and systems come in a wide variety of configurations, and FIG. 2 does not limit this disclosure to any particular computing or communication device or system.

Figure 3:
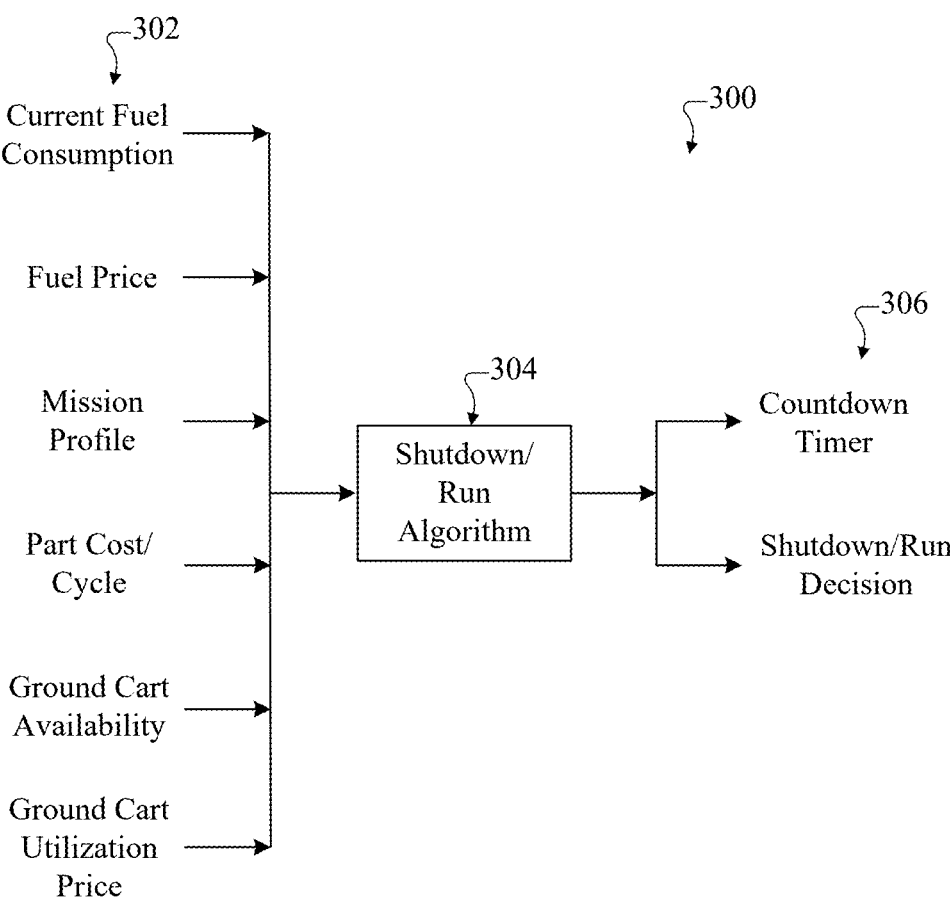
FIG. 3 illustrates an example architecture supporting shutdown/restart or keep running determinations for aircraft management according to this disclosure.

FIG. 3 illustrates an example architecture 300 supporting shutdown/restart or keep running determinations for aircraft management according to this disclosure. For ease of explanation, the architecture 300 shown in FIG. 3 is described as being implemented in the system 100 of FIG. 1, such as by using one or more instances of the device 200 of FIG. 2. However, the architecture 300 shown in FIG. 3 could be used with any other suitable device(s) and in any other suitable system(s).

As shown in FIG. 3, the architecture 300 receives and processes various inputs 302. The inputs 302 here include the various types of information discussed above, such as the current consumption of fuel or other consumables by the aircraft 102, the current price of fuel or other consumables for the aircraft 102, the mission profile for the aircraft 102, a cost per cycle of each of one or more limited lifetime parts 106 of the aircraft 102, an indication whether a ground cart 112 is available for use, and a price for utilizing the ground cart 112 with the aircraft 102 (such as a cost per minute or other period of usage). Note that the inputs 302 can vary depending on the circumstances, such as when a mission profile might not be available or when a ground cart 112 is unavailable or cannot be used with an aircraft. As a result, any combination of these or other types of input data may be used here. As discussed above, these inputs 302 may be obtained from any suitable sources, such as from one or more sensors 108, a pilot 114 or other personnel, a mobile electronic device 118, an operations base 120, or a server or computing cloud 122. Again, note that the sources of the inputs 302 can vary depending on the circumstances, and any combination of these or other types of input data sources may be used here.

A shutdown/run algorithm 304 receives the various inputs 302 and processes the inputs 302 in order to make a determination whether the engine(s) 104 of an aircraft 102 should remain running or be shut down and later restarted. At least part of the processing performed by the shutdown/run algorithm 304 can be based on the economics of keeping the engine(s) 104 of the aircraft 102 running versus the economics of shutting down and later restarting the engine(s) 104 of the aircraft 102. For example, the shutdown/run algorithm 304 can obtain or determine the current usage of fuel or other consumables by the engine(s) 104 of the aircraft 102 and determine a cost of that current usage based on the current price of the fuel or other consumables, such as a cost per minute or other time period. In some cases, this may primarily or exclusively involve the consideration of fuel usage by the aircraft 102. In other cases, this may involve the consideration of fuel, oil, and other consumables usage by the aircraft 102. As a particular example of this, the shutdown/run algorithm 304 can determine the current price of fuel (such as based on input from an operations base 120), determine the current usage of fuel by the aircraft 102 (such as based on input from a sensor 108), and use the values to obtain a price of using the fuel per minute or other time period. Similar computations can be done for other consumables like oil used by the aircraft 102. For instance, if fuel costs $2.48 per gallon (about $0.66 per liter) and the fuel consumption by the aircraft 102 is about 1.66 pounds (about 0.753 kilograms) per minute, the cost of keeping the aircraft's engine(s) 104 running may be estimated to be about $0.61 per minute, which assumes one gallon (about 3.785 liters) of fuel weights approximately 6.7 pounds (about 3.039 kilograms).

As another example, the shutdown/run algorithm 304 can obtain or determine the average cost of each limited lifetime part 106 of the aircraft 102 per cycle of the aircraft 102. For example, the shutdown/run algorithm 304 can obtain the estimated cost of replacing each limited lifetime part 106 of the aircraft 102 and divide that cost by the number of cycles permitted for the associated limited lifetime part 106. This gives the cost per cycle for each limited lifetime part 106, and the costs per cycle for all limited lifetime parts 106 of the aircraft 102 can be summed in order to identify an estimated cost of cycling the aircraft 102 once. As a particular example of this, the shutdown/run algorithm 304 may determine that a first turbine disc of an engine 104 has a cost of $100,000 and a lifetime of 30,000 cycles, a second turbine disc of an engine 104 has a cost of $50,000 and a lifetime of 30,000 cycles, and a high-pressure compressor has a cost of $50,000 and a lifetime of 30,000 cycles. Dividing each cost by the associated number of cycles provides a cost per cycle of $3.33 for the first turbine disc, a cost per cycle of $1.67 for the second turbine disc, and a cost per cycle of $1.67 for the compressor. The total cost per cycle of these limited lifetime parts 106 of the aircraft 102 would therefore be the sum of these costs, which leads to a total of $6.67 per cycle of the aircraft 102 for these limited lifetime parts 106.

The shutdown/run algorithm 304 can use the cost of the consumables per minute or other time period in order to estimate how long the engine(s) 104 of the aircraft 102 would need to run before reaching or exceeding the total cost per cycle for all limited lifetime parts 106 of the aircraft 102. For example, given the numbers above, the engine(s) 104 of the aircraft 102 may operate for approximately ten minutes and fifty-five seconds at a cost of $0.61 per minute until the cost of fuel reaches or exceeds the total cost per cycle for all limited lifetime parts 106 of the aircraft 102. In other words, the shutdown/run algorithm 304 is able to determine the length of time at which keeping the engine(s) 104 running becomes cost-equivalent to shutting down and later restarting the engine(s) 104. If a mission profile or other information is available that can be used to identify how long the aircraft 102 is expected to be on the ground or otherwise not in operation, the shutdown/run algorithm 304 can compare the determined length of time to the expected non-operation time of the aircraft 102 in order to determine whether the aircraft's engine(s) 104 should be shut down.

The shutdown/run algorithm 304 here generates one or more outputs 306 based on the processing of the inputs 302 by the shutdown/run algorithm 304. The output(s) 306 can represent guidance on how to manage operation of the aircraft 102. The output(s) 306 of the shutdown/run algorithm 304 may take various forms depending on the type(s) of inputs 302 available and the configuration of the shutdown/run algorithm 304. In some cases, for example, the shutdown/run algorithm 304 may generate an output 306 that includes a countdown timer, where the countdown timer indicates the amount of time that the engine(s) 104 of the aircraft 102 may be kept running until doing so becomes cost-equivalent to shutting down and later restarting the engine(s) 104. As a particular example, an output 306 of "If returning to power in less than 10 minutes and 55 seconds, leave the engine running. If returning to power in more than 10 minutes and 55 seconds, shut down the engine" may be presented on a display of the aircraft 102, a display of the mobile electronic device 118, or other display. Also or alternatively, the shutdown/run algorithm 304 may generate an output 306 that identifies a shutdown or run determination by the shutdown/run algorithm 304, meaning the output 306 indicates whether the engine(s) 104 of the aircraft 102 should be kept running or shut down. As a particular example, an output 306 of "Leave the engine running" or "Shut down the engine" may be presented on a display of the aircraft 102, a display of the mobile electronic device 118, or other display.

Note that the specific examples above are purely economics-based computations and decisions, meaning the estimated cost of keeping the engine(s) 104 running is compared to the estimated cost of shutting down and later restarting the engine(s) 104. However, the shutdown/run algorithm 304 may take a number of additional inputs and factors into account when making a shutdown or run determination. For example, it may become known that a replacement for a limited lifetime part 106 is not currently available due to a supply chain issue or other issue. In this case, if the limited lifetime part 106 is nearing the end of its cycle count or lifetime based on the number of cycles it has undergone, the shutdown/run algorithm 304 may reconfigure its analysis so that the cost of running the engine(s) 104 might need to exceed (and possibly might need to greatly exceed) the cost per cycle of the limited lifetime parts 106 of the aircraft 102 before the determination is made to shut down the engine(s) 104. As another example, it may become known that the time needed to perform maintenance and replace one or more limited lifetime parts 106 is extremely long, which could interfere with operation of the aircraft 102 for a prolonged period of time. In that case, if any of the limited lifetime parts 106 is nearing the end of its cycle count, the shutdown/run algorithm 304 may again reconfigure its analysis so that the cost of running the engine(s) 104 might need to exceed (and possibly might need to greatly exceed) the cost per cycle of the limited lifetime parts 106 of the aircraft 102 before the determination is made to shut down the engine(s) 104. Based on this, in some embodiments, it is possible for the shutdown/run algorithm 304 to weight different inputs 302 more or less depending on the circumstances. The different weights can be provided from any suitable source(s), including those mentioned above.

Although FIG. 3 illustrates one example of an architecture 300 supporting shutdown/restart or keep running determinations for aircraft management, various changes may be made to FIG. 3. For example, the architecture 300 may be used to process any suitable inputs 302 and generate any suitable outputs 306 depending on the implementation.

Figure 4:
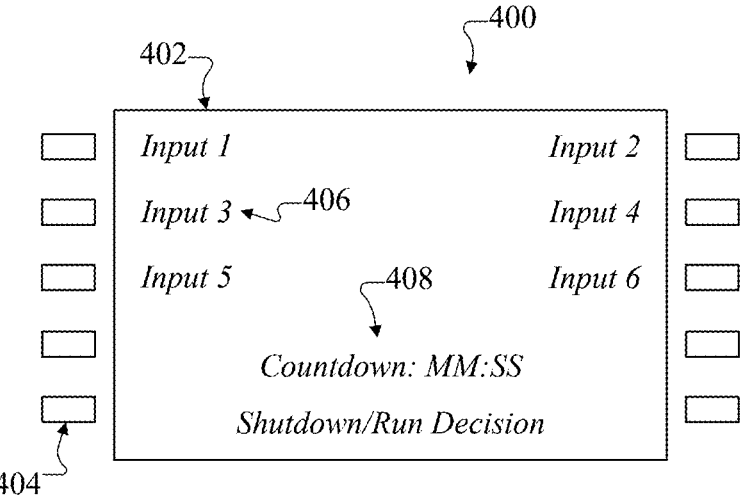
FIG. 4 illustrates an example aircraft display for use with shutdown/restart or keep running determinations for aircraft management according to this disclosure.

FIG. 4 illustrates an example aircraft display 400 for use with shutdown/restart or keep running determinations for aircraft management according to this disclosure. In some embodiments, the aircraft display 400 may be positioned inside the aircraft 102 in a location where the aircraft display 400 is visible to a pilot 114 or other personnel, such as in a cockpit of the aircraft 102.

As shown in FIG. 4, the aircraft display 400 includes a display device 402 and various buttons 404. The display device 402 represents any suitable structure configured to present information to a user, such as a light emitting diode (LED) display, liquid crystal display (LCD), or other type of display device. The buttons 404 can be used by the user to provide various inputs to the display device 402 or to a processing device 202 or other component(s) that are communicatively coupled to the display device 402. For instance, the pilot 114 or other personnel could use the buttons 404 to select various options presented on the display device 402, which may be used to control the contents presented on the display device 402. The buttons 404 may also be used by the pilot 114 or other personnel to provide input data to the processing device 202 or other component(s) that are communicatively coupled to the display device 402.

The aircraft display 400 may be used in conjunction with the shutdown/run algorithm 304 or other logic that makes shutdown/restart or keep running determinations for the aircraft 102. For example, the display device 402 may display various input-related options 406 that can be selected by the pilot 114 or other personnel, and the pilot 114 or other personnel may use the buttons 404 to select one or more of these input-related options 406. Thus, for instance, the pilot 114 or other personnel may use the aircraft display 400 to provide an indication of how long the aircraft 102 is expected to remain on the ground or otherwise not in operation prior to returning to operation. This input can be used by the shutdown/run algorithm 304 as described above to determine whether the engine(s) 104 should remain running or be shut down. As another example, the display device 402 may display one or more output-related options 408, which can be based on the output(s) 306 generated by the shutdown/run algorithm 304 or other logic. For instance, the one or more output-related options 408 may include a countdown timer, an indication that the engine(s) 104 should remaining running or be shut down, or both.

Although FIG. 4 illustrates one example of an aircraft display 400 for use with shutdown/restart or keep running determinations for aircraft management, various changes may be made to FIG. 4. For example, any other suitable type of display may be used here, such as a touchscreen that is used in conjunction with one or more buttons 404 or that lacks any buttons 404. Also, while the display of various inputs and outputs is shown here, these are for illustration and explanation only. In addition, while the use of an aircraft display 400 represents one example mechanism in which inputs can be received and outputs can be provided, this disclosure is not limited to any specific types of input/output devices.

Figure 5:
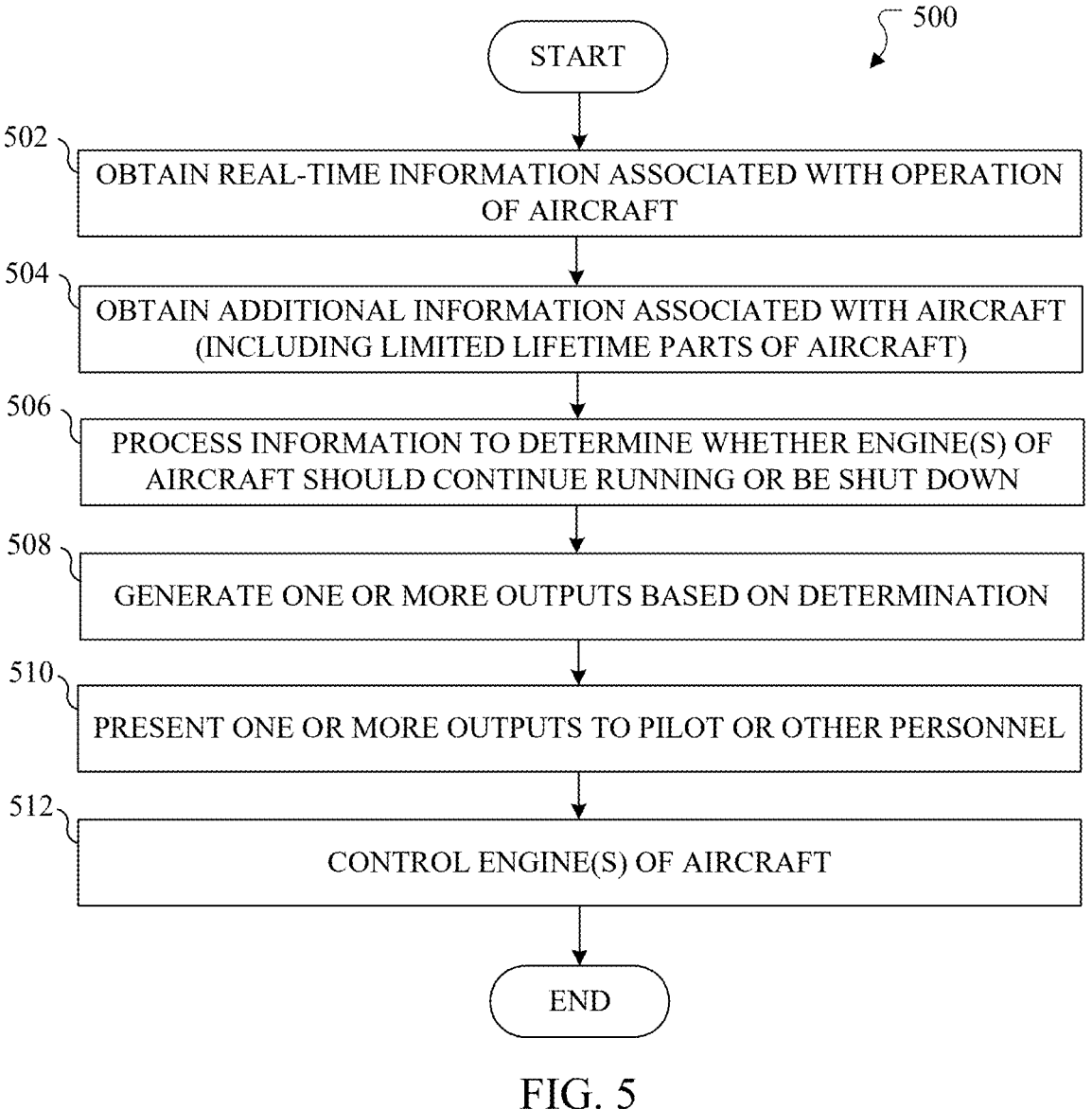
FIG. 5 illustrates an example method for shutdown/restart or keep running determinations for aircraft management according to this disclosure.

FIG. 5 illustrates an example method 500 for shutdown/restart or keep running determinations for aircraft management according to this disclosure. For case of explanation, the method 500 shown in FIG. 5 is described as being implemented in the system 100 of FIG. 1, such as by using one or more instances of the device 200 of FIG. 2 to implement the architecture 300 of FIG. 3. However, the method 500 shown in FIG. 5 could be used with any other suitable device(s) and architecture(s) and in any other suitable system(s).

As shown in FIG. 5, real-time information associated with operation of an aircraft is obtained at step 502, and other information associated with the aircraft (including information associated with limited lifetime parts of the aircraft) is obtained at step 504. This may include, for example, the processing device 202 obtaining one or more inputs 302 from one or more sensors 108 related to real-time fuel consumption or other consumables consumption by the aircraft 102. This may also include the processing device 202 obtaining inputs 302 from one or more sources related to a price of fuel or other consumables, a mission profile of the aircraft 102, a price per cycle for each of one or more limited lifetime parts 106 of the aircraft 102, and a price of using a ground cart 112. Any suitable combination of these types of inputs may also be obtained here, and the information may be obtained from any suitable sources.

The information is processed to determine whether the engine(s) of the aircraft should continue running or be shut down at step 506. This may include, for example, the processing device 202 executing the shutdown/run algorithm 304 to process the information and make a shutdown or keep running determination. In some cases, this may include the processing device 202 determining the cost of keeping the engine(s) 104 of the aircraft 102 running per minute or other unit time period, such as based on the price and current usage of fuel or other consumables by the aircraft 102. This may also include the processing device 202 determining the total cost per cycle for the limited lifetime parts 106 of the aircraft 102. This may further include the processing device 202 determining the length of time at which keeping the engine(s) 104 of the aircraft 102 running becomes cost-equivalent to shutting down and subsequently restarting the engine(s) 104 of the aircraft 102. In addition, this may include the processing device 202 taking into account additional factors like the availability of replacements for limited lifetime parts 106, the estimated length of maintenance, local pollution levels, local regulations, or other information that might affect whether the engine(s) 104 of the aircraft 102 can or should remain running or be shut down.

One or more outputs based on the determination are generated at step 508 and presented to at least one pilot or other personnel at step 510. This may include, for example, the processing device 202 generating one or more outputs 306, such as a countdown timer or an indication that the engine(s) 104 of the aircraft 102 should remain running or be shut down. This may also include the processing device 202 presenting the one or more outputs 306 to the pilot 114 or other personnel (such as via an aircraft display 400) or communicating the one or more outputs 306 for presentation (such as via a mobile electronic device 118). At that point, the engine(s) of the aircraft may be controlled based on the determination at step 512. This may include, for example, the pilot 114 allowing the engine(s) 104 of the aircraft 102 to remain running (at least for some period of time) or shutting down the engine(s) 104 of the aircraft 102, or this may include controlling the engine(s) 104 of the aircraft 102 in an automated manner.

Although FIG. 5 illustrates one example of a method 500 for shutdown/restart or keep running determinations for aircraft management, various changes may be made to FIG. 5. For example, while shown as a series of steps, various steps in FIG. may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining, using at least one processing device, real-time information associated with operation of an aircraft from one or more sensors of the aircraft;

obtaining, using the at least one processing device, additional information associated with the aircraft, at least some of the additional information associated with limited lifetime parts of the aircraft;

providing the real-time information and the additional information as inputs to a shutdown determination algorithm;

processing, using the at least one processing device and the shutdown determination algorithm executed by the at least one processing device, the real-time information and the additional information to generate a determination whether one or more engines of the aircraft should continue running or should be shut down and subsequently restarted, wherein inputs are weighted by the shutdown determination algorithm based on operating circumstances; and automatically controlling operation of the one or more engines of the aircraft based on the determination.

2. The method of claim 1, further comprising:

generating, using the at least one processing device, at least one output identifying how to operate the one or more engines of the aircraft based on the determination;

displaying the at least one output on an aircraft display;

wherein the at least one output comprises at least one of:

an indication whether the one or more engines of the aircraft should be kept running or shut down; or a countdown timer indicating an amount of time that the one or more engines of the aircraft may be kept running until doing so becomes cost-equivalent to shutting down and later restarting the one or more engines.

3. The method of claim 2, further comprising:

receiving input from a pilot of the aircraft via the aircraft display;

wherein the additional information associated with the aircraft comprises the input from the pilot.

4. The method of claim 1, wherein:

the real-time information associated with operation of the aircraft comprises a real-time consumption of fuel by the aircraft; and processing the real-time information and the additional information comprises generating an estimated cost of keeping the one or more engines of the aircraft running based on the real-time consumption of fuel by the aircraft and a price of the fuel.

5. The method of claim 4, wherein:

the additional information associated with the aircraft comprises a cost per cycle for each of the limited lifetime parts of the aircraft; and processing the real-time information and the additional information further comprises generating an estimated cost of shutting down and subsequently restarting the one or more engines based on a total cost per cycle for the limited lifetime parts of the aircraft.

6. The method of claim 1, wherein:

the additional information associated with the aircraft comprises a mission profile of the aircraft; and processing the real-time information and the additional information comprises:

estimating a forecasted time until the aircraft is expected to begin using the one or more engines for its next flight based on the mission profile; and determining whether the one or more engines of the aircraft should continue running or should be shut down and subsequently restarted based on the forecasted time.

7. The method of claim 1, wherein:

the additional information associated with the aircraft comprises an indication whether a ground cart is available to power the aircraft; and processing the real-time information and the additional information comprises:

identifying a cost of using the ground cart; and determining whether the one or more engines of the aircraft should continue running or should be shut down and subsequently restarted based on the cost of using the ground cart.

8. An apparatus comprising:

at least one processing device configured to:

obtain real-time information associated with operation of an aircraft from one or more sensors of the aircraft;

obtain additional information associated with the aircraft, at least some of the additional information associated with limited lifetime parts of the aircraft;

provide the real-time information and the additional information as inputs to a shutdown determination algorithm;

process, using the shutdown determination algorithm executed by the at least one processing device, the real-time information and the additional information to generate a determination whether one or more engines of the aircraft should continue running or should be shut down and subsequently restarted, wherein inputs are weighted by the shutdown determination algorithm based on operating circumstances; and automatically control operation of the one or more engines of the aircraft based on the determination.

9. The apparatus of claim 8, wherein:

the at least one processing device is further configured to generate at least one output identifying how to operate the one or more engines of the aircraft based on the determination and initiate display of the at least one output on an aircraft display; and the at least one output comprises at least one of:

an indication whether the one or more engines of the aircraft should be kept running or shut down; or a countdown timer indicating an amount of time that the one or more engines of the aircraft may be kept running until doing so becomes cost-equivalent to shutting down and later restarting the one or more engines.

10. The apparatus of claim 9, wherein:

the at least one processing device is further configured to receive input from a pilot of the aircraft via the aircraft display; and the additional information associated with the aircraft comprises the input from the pilot.

11. The apparatus of claim 8, wherein:

the real-time information associated with operation of the aircraft comprises a real-time consumption of fuel by the aircraft; and to process the real-time information and the additional information, the at least one processing device is configured to generate an estimated cost of keeping the one or more engines of the aircraft running based on the real-time consumption of fuel by the aircraft and a price of the fuel.

12. The apparatus of claim 11, wherein:

the additional information associated with the aircraft comprises a cost per cycle for each of the limited lifetime parts of the aircraft; and to process the real-time information and the additional information, the at least one processing device is further configured to generate an estimated cost of shutting down and subsequently restarting the one or more engines based on a total cost per cycle for the limited lifetime parts of the aircraft.

13. The apparatus of claim 8, wherein:

the additional information associated with the aircraft comprises a mission profile of the aircraft; and to process the real-time information and the additional information, the at least one processing device is configured to:

estimate a forecasted time until the aircraft is expected to begin using the one or more engines for its next flight based on the mission profile; and determine whether the one or more engines of the aircraft should continue running or should be shut down and subsequently restarted based on the forecasted time.

14. The apparatus of claim 8, wherein:

the additional information associated with the aircraft comprises an indication whether a ground cart is available to power the aircraft; and to process the real-time information and the additional information, the at least one processing device is configured to:

identify a cost of using the ground cart; and determine whether the one or more engines of the aircraft should continue running or should be shut down and subsequently restarted based on the cost of using the ground cart.

15. A non-transitory machine readable medium containing instructions that when executed cause at least one processor to:

obtain real-time information associated with operation of an aircraft from one or more sensors of the aircraft;

obtain additional information associated with the aircraft, at least some of the additional information associated with limited lifetime parts of the aircraft;

provide the real-time information and the additional information as inputs to a shutdown determination algorithm;

process, using the shutdown determination algorithm executed by the at least one processor, the real-time information and the additional information to generate a determination whether one or more engines of the aircraft should continue running or should be shut down and subsequently restarted, wherein inputs are weighted by the shutdown determination algorithm based on operating circumstances; and automatically control operation of the one or more engines of the aircraft based on the determination.

16. The non-transitory machine readable medium of claim 15, further containing instructions that when executed cause at least one processor to generate at least one output identifying how to operate the one or more engines of the aircraft based on the determination and initiate display of the at least one output on an aircraft display;

wherein the at least one output comprises at least one of:

an indication whether the one or more engines of the aircraft should be kept running or shut down; or a countdown timer indicating an amount of time that the one or more engines of the aircraft may be kept running until doing so becomes cost-equivalent to shutting down and later restarting the one or more engines.

17. The non-transitory machine readable medium of claim 16, further containing instructions that when executed cause at least one processor to receive input from a pilot of the aircraft via the aircraft display;

wherein the additional information associated with the aircraft comprises the input from the pilot.

18. The non-transitory machine readable medium of claim 15, wherein:

the real-time information associated with operation of the aircraft comprises a real-time consumption of fuel by the aircraft; and the instructions that when executed cause at least one processor to process the real-time information and the additional information comprise instructions that when executed cause at least one processor to generate an estimated cost of keeping the one or more engines of the aircraft running based on the real-time consumption of fuel by the aircraft and a price of the fuel.

19. The non-transitory machine readable medium of claim 18, wherein:

the additional information associated with the aircraft comprises a cost per cycle for each of the limited lifetime parts of the aircraft; and the instructions that when executed cause at least one processor to process the real-time information and the additional information comprise instructions that when executed cause at least one processor to generate an estimated cost of shutting down and subsequently restarting the one or more engines based on a total cost per cycle for the limited lifetime parts of the aircraft.

20. The non-transitory machine readable medium of claim 15, wherein:

the additional information associated with the aircraft comprises a mission profile of the aircraft; and the instructions that when executed cause at least one processor to process the real-time information and the additional information comprise instructions that when executed cause at least one processor to:

estimate a forecasted time until the aircraft is expected to begin using the one or more engines for its next flight based on the mission profile; and determine whether the one or more engines of the aircraft should continue running or should be shut down and subsequently restarted based on the forecasted time.

* * * * *